UNITED STATES PATENT OFFICE.

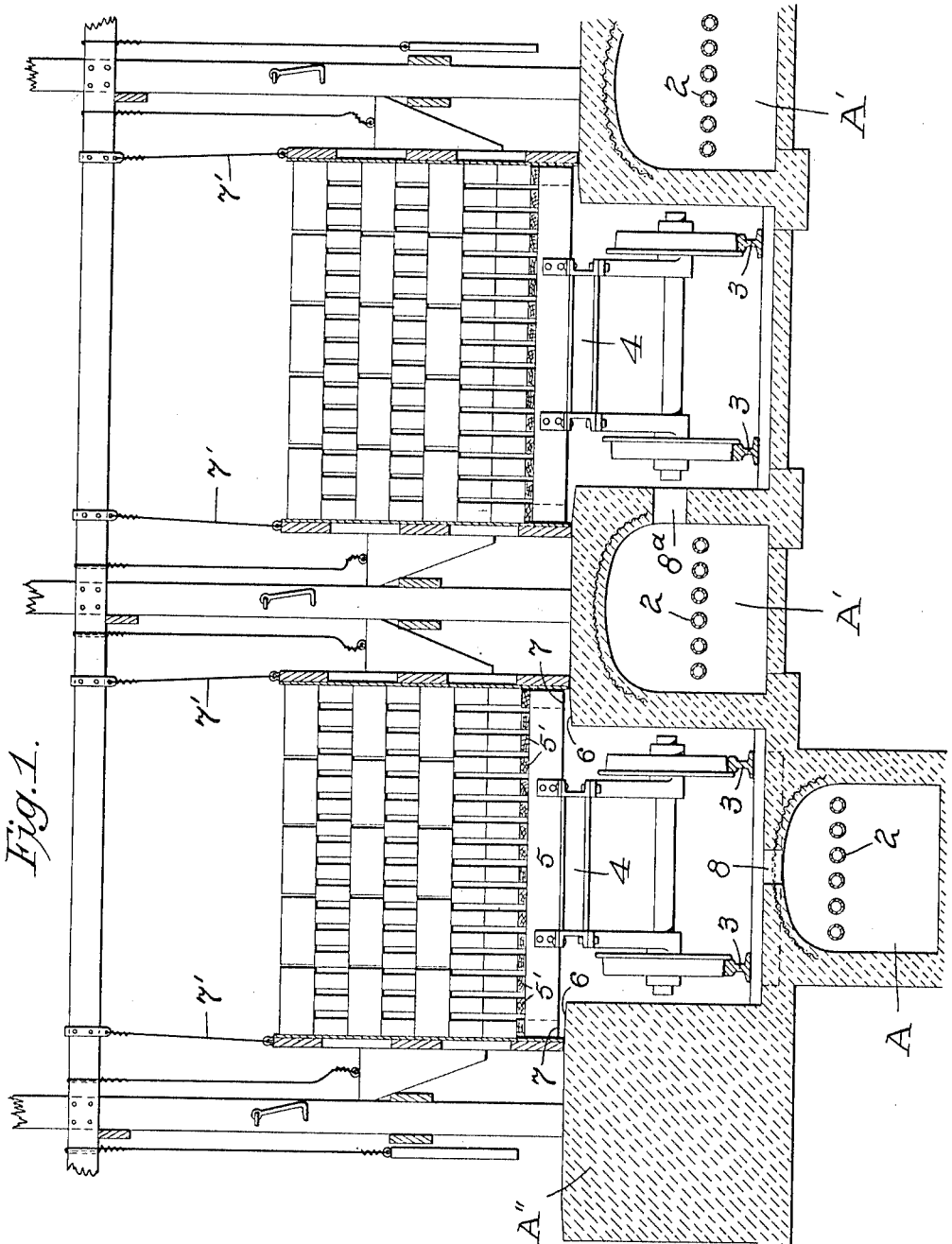

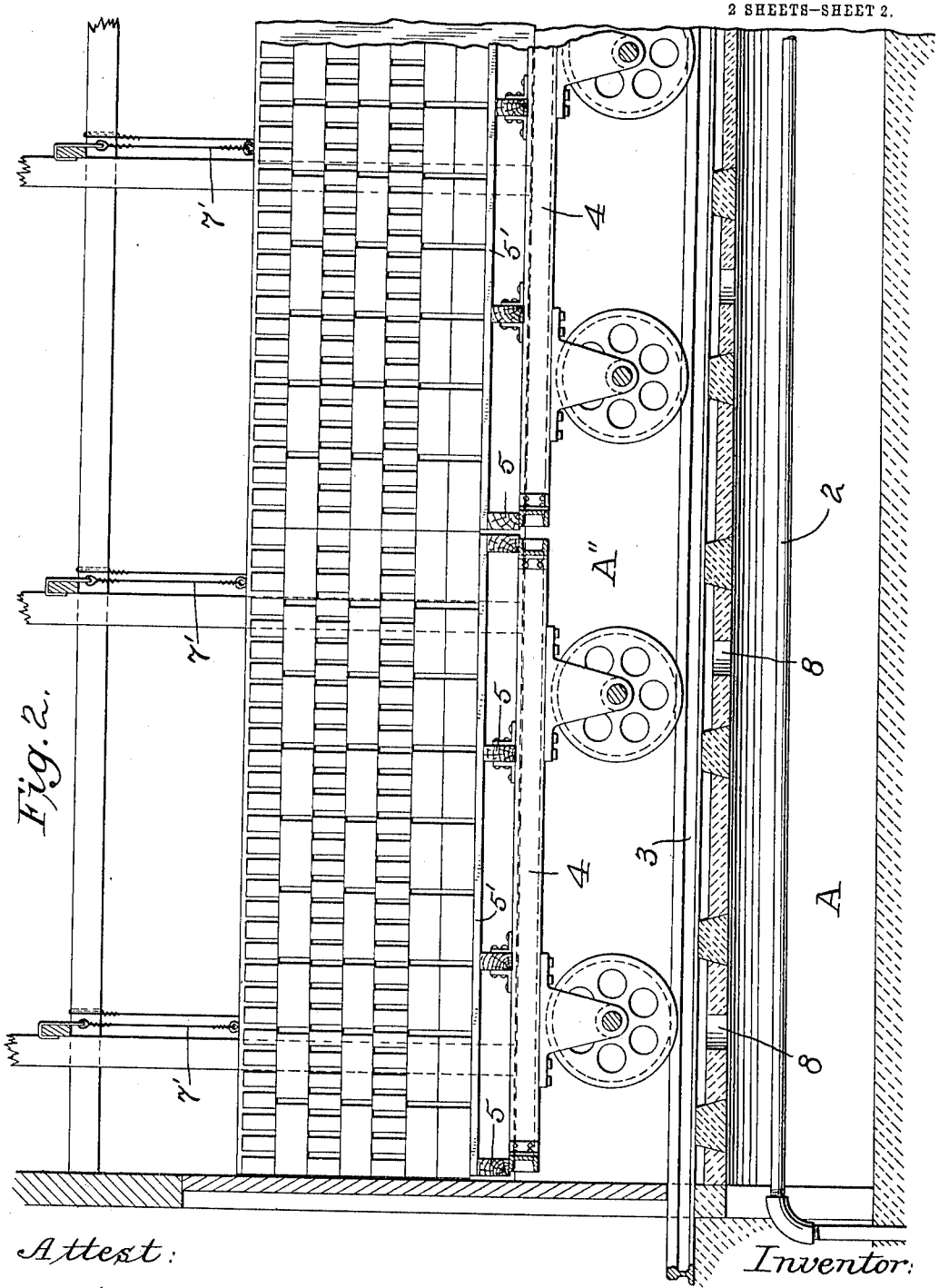

JOHN C. BOSS, OF ELKHART, INDIANA.

DRYING BRICKS.

1,072,302.

Specification of Letters Patent.

Patented Sept. 2, 1913.

Application filed May 6, 1912. Serial No. 695,436.

*To all whom it may concern:*

Be it known that I, JOHN C. Boss, citizen of the United States, residing at Elkhart, Indiana, have invented certain new and useful Improvements in Drying Bricks, of which the following is a specification.

My invention hereinafter described, relates to the drying of bricks, and has, as its object, the more direct or uniform application of the air current, to the mass of bricks, and the more direct removal of moisture absorbed by the air, so that the moisture once removed from the mass of bricks, or any portion of said mass, will not come again into contact, with any other part of said mass. This concerns economy of heat, and rapid and uniform drying.

Prior to this my invention, the art of drying bricks has been practised by running cars laden with loosely piled bricks, into tunnels, closed on the sides and top, and at the receiving end, and opening into an exhaust passage, at the other end. This construction confines the drying current, and continues it from the air inlet end to the discharge. But it also includes and continues the moisture, absorbed at the initial and earlier action, and the drying current becomes less and less effective from beginning to end.

My invention includes in the completed construction, these old cars, for carrying the loosely piled brick, the ducts for the heated air and the trucks above the ducts, and consists, first, of a method of discharging the air drying current, laterally confined, directly through the mass of bricks, loosely piled on the car or cars throughout the length of the active duct, and directly discharging the moisture laden air into the atmosphere.

It consists further in a method of loading and locating the cars, so as to form a continuous series of cars, and continuous mass of bricks from end to end, in closing the sides and discharging the drying current from the drying air duct, through a coterminous line of piled bricks, directly into the atmosphere.

It consists further in the new and useful construction, whereby these methods are carried on.

I have illustrated these constructions and the method, by the accompanying drawings, in which, Figure 1 shows a front view of the drier, and Fig. 2, a central longitudinal vertical section.

In these drawings the air ducts are shown at A, A', these being different arrangements of the ducts, as hereinafter explained. These ducts extend the entire length of the track and are closed at the sides and ends, and have openings upward only, so as to direct the drying current upward through the masses of brick placed above them. The air in the ducts is heated in any approved way. As shown, steam pipes or coils 2 are located in the ducts, and in these waste steam may be utilized. These pipes or coils are, for the best effect, coextensive with the ducts. As shown at A, the duct is located directly beneath the trackway 3, on which run the brick carrying cars, represented at 4. These cars are steel trucks (about 7 feet long) being mounted on wheels, adapted to run on rails in the channel between the ducts A' or over the duct or ducts A, if the latter are used.

The direct support for the bricks consists of a pallet formed as a frame, in which, as shown 2x4 wood scantling 5 are laid across the top, or platform of the truck, in number sufficient to sustain the strips or slats 5' secured thereon. These slats are at least as wide as the thickness of a brick, and are laid about three fourths of an inch apart. Preferably the first two courses of the brick are piled lengthwise of the slats, faced two deep, and the third and all succeeding courses are alternately laid crosswise, but all with spaces of about three fourths of an inch between bricks, so that there are continuous air passages from bottom to top throughout the entire mass of bricks. It will be understood that this wooden frame or brick supporting pallet is made wider than the car truck and extends on each side, over the edge of the flat top of the duct, when the duct A' is used, and over the flat top of an intermediate extension of the base (as at 6) when the duct A, is used. The parts are so proportioned that the lateral edge of the pallet moves as close to said flat top surface as practicable, on the entrance of the car, as indicated at 7. This allows the side curtains to fit closely upon said surface, and any suitable means may be used to make, at that edge, a close joint. The pallet extends at each end, so that the end of the pallet on one car will abut against the end of the next succeeding car, and make a continuous platform, and the bricks are piled flush with the lateral end and edges of the pallets, so that, when in place the bricks of all the trucks form a continuous line or column, and are acted on as one body, throughout the entire length. The curtains therefore are necessary only at the sides and extreme ends of the entire column of brick laden trucks, and not at the ends of each truck. They are made practically continuous on all sides, and are made of any material suitable for the conditions. They are suspended by chains or ropes, as indicated at 7', or in any suitable way, movable toward and from the sides, and are held close to the surfaces to be covered, by wedges or any equivalent means. The top of the whole column of brick laden trucks is open for the free escape to the atmosphere, of the moist air as it rises from the mass of bricks, throughout the entire length of the column.

The ducts when provided with interior heating appliances, are open at both ends, for the admission of air, in proper amount. When the ducts are located directly beneath the tracks, openings at proper intervals are made in the top of the arch, as shown at 8, of four inches in diameter. But when the ducts A' are used, similar air passages 8ª are made in the side wall of the duct. In both cases the dry air from the duct is discharged into the closed space beneath the piled bricks and is free to rise up through the mass. It will be understood that suitable means may be used to give force to the air and to drive it through the interstices of the mass of bricks. But this force is less for the reason that the air is held in by the curtain, no lateral eddies are possible, and there is free escape from the top. Further, the heat is economized and the draft ultimately increased, as the mass of green bricks is a good conductor of heat, and thus heat by conduction as well as by convection is carried from bottom to top. In this arrangement no draft chimney is needed. I prefer the elevated ducts A' with the lateral discharge openings, since in this construction the openings are not liable to be clogged.

The operation, indicated in the above description, is simple. The bricks piled on the truck platform at the machine, are flush with said platform on all sides, and as the cars are run on the tracks above the ducts, the brick-loads abut. The curtains are applied to the sides and entrance ends, and the air admitted from the ducts is directed exclusively through the mass of bricks, through the entire length of the column, and escapes directly at all points throughout the uncovered top, carrying the eliminated moisture directly into the atmosphere. As the curtain is continuous and close on the sides and ends there can be no eddies or disturbing currents, the drying agent is directly and evenly applied to the mass of brick throughout, and the greater heat originated at the bottom is conducted upward by the bricks themselves.

I claim as my invention, substantially as described:

An apparatus for drying brick comprising a track and side walls forming an open-topped track channel, said side walls having flat tops, trucks adapted to run on said track within said channel, and having permanently attached platforms with their sides overlapping and in close proximity to the flat tops of the walls, curtains adapted to cover the vertical surfaces of the loads on the truck, and air ducts for supplying heated air to said track channels, substantially as described.

In testimony whereof, I affix my signature in presence of two witnesses.

JOHN C. BOSS.

Witnesses:
CARRIE M. BECKNER,
ETHEL G. ABBEY.

Copies of this patent may be obtained for five cents each, by addressing the "Commissioner of Patents, Washington, D. C."